No. 629,807. Patented Aug. 1, 1899.
C. W. McFARLAND.
COMBINED CULTIVATOR AND PLANTER.
(Application filed Apr. 24, 1899.)
(No Model.) 2 Sheets—Sheet 1.

Witnesses Charles W. McFarland, Inventor.
By his Attorneys,

THE NORRIS PETERS CO., PHOTO-LITHO., WASHINGTON, D. C.

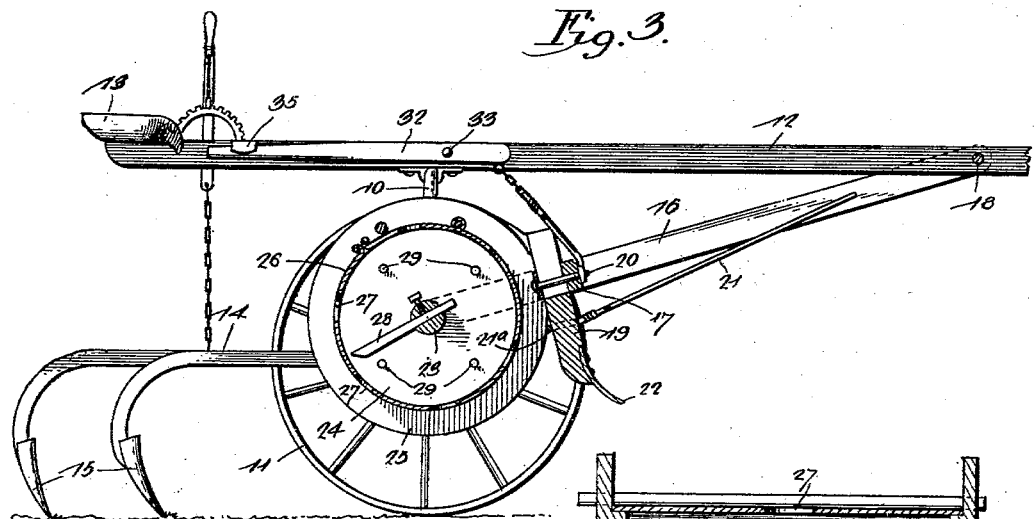
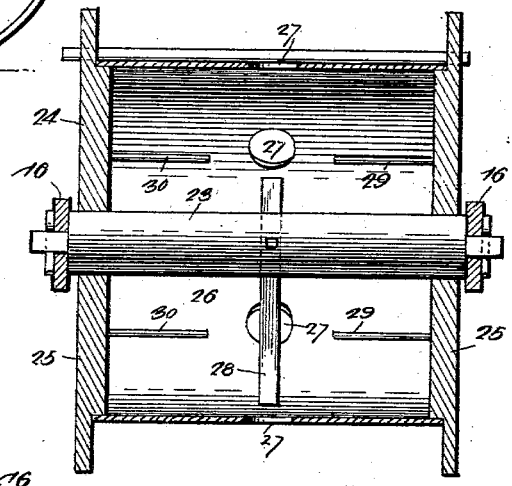
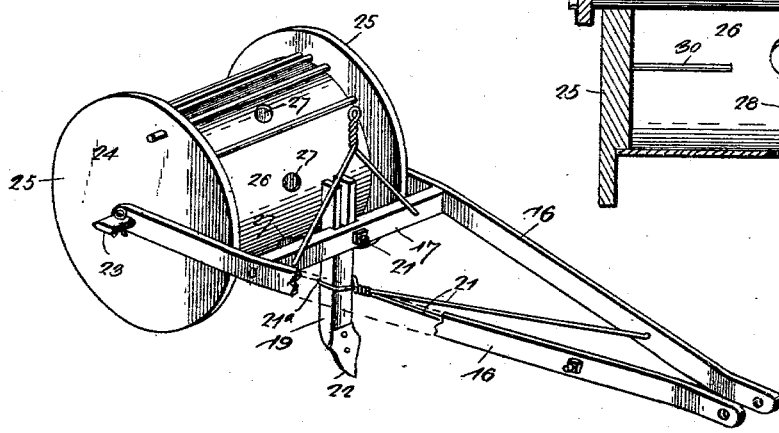

UNITED STATES PATENT OFFICE.

CHARLES W. McFARLAND, OF CHANDLER, OKLAHOMA TERRITORY.

COMBINED CULTIVATOR AND PLANTER.

SPECIFICATION forming part of Letters Patent No. 629,807, dated August 1, 1899.

Application filed April 24, 1899. Serial No. 714,196. (No model.)

*To all whom it may concern:*

Be it known that I, CHARLES W. MCFARLAND, a citizen of the United States, residing at Chandler, in the county of Lincoln and Territory of Oklahoma, have invented a new and useful Combined Cultivator and Planter, of which the following is a specification.

My invention relates to improvements in combined cultivators and planters; and the object in view is to provide a planter mechanism which may be readily connected to and used in connection with a cultivator of that type having an arched axle and adjustable gangs of shovels, whereby the machine may be used for cultivating a growing cotton crop and for replanting any vacant spaces in the rows of plants, which spaces may be washed out by rains and which are particularly liable to occur on hillsides.

A further object of the invention is to provide the planter mechanism with means for raising and lowering the rolling hopper thereof into or out of operative position and also to regulate the escape of seed from the hopper.

The implement of my invention may be used in a manner to save the labor of bedding the ground with the lister or cultivator implement and subsequently planting the seed with a one-horse drill, as commonly practiced, and which method has been found to be objectionable, because the drill cannot be kept on the top of the bed nor controlled to plant the seed in a straight row.

The invention consists in the novel combination of parts and in the construction and arrangement thereof, as will be hereinafter fully described and claimed.

To enable others to understand the invention, I have illustrated the preferred embodiment thereof in the accompanying drawings, forming a part of this specification, and in which—

Figure 1:
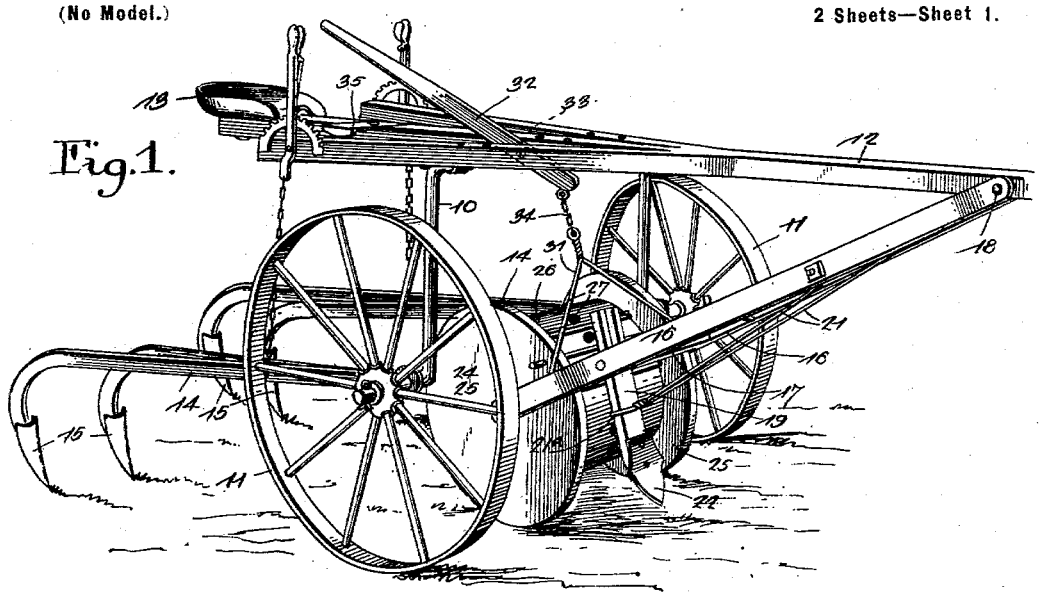
Figure 2:
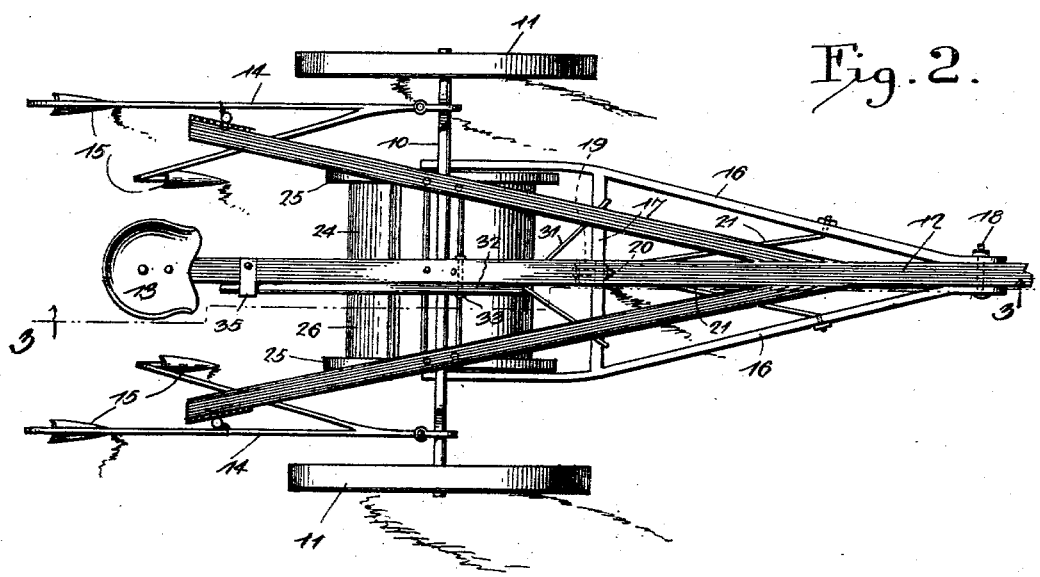

Figure 1 is a perspective view of a combined cultivator and seed-planter, illustrating the invention. Fig. 2 is a plan view of the combined machine. Fig. 3 is a longitudinal section on the plane indicated by the dotted line 3 3 of Fig. 2, looking in the direction indicated by the arrow. Fig. 4 is a detail perspective view of the planter mechanism removed from the cultivator. Fig. 5 is a vertical cross-sectional view through the rolling hopper of the planter mechanism.

The same numerals of reference are used to indicate like and corresponding parts in each of the several figures of the drawings.

10 designates the arched axle, which is provided with the carrying-wheels 11, and to the upper middle part of this axle is firmly secured the draft-tongue 12 of the implement. This draft-tongue extends rearwardly beyond the axle to support the driver's seat 13, and to the axle 10 is connected the independent frames 14, which carry the gangs of shovels 15. The shovels and the supporting-frames therefor are similar to devices well known to those skilled in the art, and with the frames are combined suitable operating-levers adapted to raise and lower the gangs of shovels. I have not considered it necessary, however, to illustrate or describe in detail the means for adjusting the gang-frames, because such devices constitute no part of the present invention.

The planter mechanism which I have invented is especially adapted for use in connection with a cultivator implement of the class hereinbefore described and which is represented by the drawings, and this planter mechanism is adapted to be connected operatively with the draft-tongue 12 and to lie within the limits of the arched axle 10. Said planter mechanism essentially contemplates the employment of a hopper adapted to be rotated by frictional contact with the ground, and the supporting-frame for this rolling hopper is so connected to the cultivator implement that the rolling hopper is disposed in practically the vertical plane of the arched axle and in advance of the gang-frames 14. With the cultivator attachment is associated means by which the rolling hopper may be raised or lowered at the option of the attendant, and the combined machine is especially useful for cultivating the crop and for replanting seed in vacant spaces of the rows which may be washed out by rains.

The planter attachment has a frame which is formed by a pair of diverging bars 16, which are united firmly together at points intermediate their length by a cross-bar 17, said cross-bar being interposed between the bars 16 and secured firmly thereto in any approved manner. The bars of the planter-frame approach each other toward their front ends and they are arranged to lap or bear against opposite sides of the tongue 12 of the cultivator. The planter-frame is thus arranged below the tongue and axle of the cultivator to assume an inclined relation thereto, and the front end of said planter-frame is connected pivotally to the cultivator-tongue 12 by a bolt 18, which passes through the bars 16 and the tongue 12.

The cross-bar 17 of the planter-frame is utilized as a means for supporting a vertical shovel-standard 19 in front of the rolling hopper, and this standard is secured firmly to the cross-bar by a bolt 20, which passes through a suitable opening in the bar 17 and is fastened to the shovel-standard. The stays 21 are employed to strengthen the standard 19 against the pressure of the soil on the shovel thereof. These stays are formed with the eye 21$^a$ at the rear end, which eye is adapted to embrace the standard 19, and the front ends of the stays are fastened to the side bars 16 of the planter-frame. The shovel-standard is disposed in a vertical position at one side of the cross-bar 17, and the lower end of said standard is equipped with a furrow-opening shovel 22 of any suitable construction.

The planter-frame supports the axle 23 for the rolling hopper 24, and said axle is secured in the side bars 16 of said planter-frame at a suitable distance in rear of the cross-bar 17, the latter serving to stay or brace the bars 16 of said planter-frame. The hopper 24 consists of the heads 25 and a cylindrical shell 26. The heads are arranged parallel to each other and they are of greater diameter than the shell 26. The shell 26 is secured at its edges in any suitable way to the inner faces of the heads, and as the shell is of less diameter than said heads it is maintained thereby out of contact with the ground when the planter mechanism is lowered for the hopper to trail on the ground, so as to be rotated by frictional contact with the ground when the machine is drawn by the team. The length of the rolling hopper is nearly equal to the space between the rear ends of the side bars 16, and the heads of said hopper are provided with central openings adapted to loosely receive the axle 23, which is maintained in a stationary position by attachment to the planter-frame, whereby the hopper is free to rotate on the axle; but the hopper may partake of the vertical adjustments of the planter-frame. The shell 26 of said hopper is provided with a series of outlet-openings 27, arranged equidistant throughout the circumference of said hopper, and within the hopper is provided a feed-regulator 28, which is secured firmly to the axle 23 and is disposed in the vertical plane of the openings 27. The openings are adapted to be brought successively opposite to the lower end of the regulator 28 on the rotation of the hopper when the machine is in service, and said regulator is fastened to the axle 23 to be adjusted with relation to the shell of the hopper, whereby the regulator may be brought close to or farther from the hopper-shell to regulate the quantity of seed which may escape through the opening in the lower part of said hopper. To prevent the seed from clogging the openings of the hopper, I have provided the series of agitator-pins 29 and 30, which are fastened to the respective heads 25 of the hopper and which extend inwardly toward the vertical axis of said hopper. The contiguous ends of the agitator-pins terminate on opposite sides of the plane of the regulator 28, and thus the pins are made to rotate with the hopper without impinging against the fixed regulator in order to effectually stir or agitate the seed which is contained within the hopper.

To the cross-bar 17 of the planter-frame is secured a bail or loop 31, and on the tongue 12 of the cultivator is mounted an operating-lever 32. Said lever is fulcrumed at a point intermediate its length at 33 to the tongue 12, and the short arm of said lever is connected by a link 34 to the bail 31 of the planter-frame. The lever is adapted to engage a keeper 35, which is fixed to the tongue in the path of the lever, and when the lever is depressed to raise the planter-frame its long arm is adapted to engage with said keeper in order to suspend the planter-frame from the cultivator-frame.

The planter mechanism of my invention may be easily attached to and used in connection with any ordinary cultivator of that class having an arched axle, and it is only necessary to connect the planter-frame to the cultivator-tongue by the bolt 18, to fulcrum the lever on said cultivator-tongue, and to provide the keeper in a proper position for engagement by the lever. The operator may raise the planter mechanism to a position where the hopper will be free from contact with the ground by depressing one end of said lever and engaging the same with the keeper, and thus the implement may be used for the purpose of cultivating the crop without any hindrance whatever from the planter mechanism, because it is suspended from the cultivator, and the hopper lies in advance and out of the way of the cultivator-gangs. The gangs of the cultivator may be adjusted by the operator to the desired positions for treating the growing plants; but in the service of the machine the operator when the machine reaches a place where the plants have been washed out of the row may release the lever in order to lower the planter-frame, so that the rolling hopper will be brought into service. This hopper will thereupon rotate by contact with the ground in order to plant the seed at regular intervals in the washed-out spaces of the row, and the operator may easily throw the planter out of service by simply depressing the lever.

I attach special importance to the arrangement of the planter mechanism with relation to the cultivator implement in a manner to have the planter-frame attached pivotally to the cultivator-tongue and the rolling hopper in the vertical plane of the arched axle, so that the hopper will lie in advance and out of the way of the gang-frames which carry the cultivator-shovels. The shovel-standard is in the same longitudinal plane as the openings in the hopper, and the shovel of said standard is adapted to open a furrow into which the seed is deposited by the hopper, and this seed is covered by the cultivator-shovels throwing the soil inwardly upon the furrow.

Changes in the form, proportion, size, and the minor details of construction within the scope of the appended claims may be resorted to without departing from the spirit or sacrificing any of the advantages of this invention.

Having thus described the invention, what I claim is—

1. In a combined cultivator and planter, the combination with an arched axle, a tongue and the shovel-frames, of a planter-frame connected to said tongue, a rolling hopper journaled in the planter-frame and arranged in the vertical plane of said arched axle and in advance of the shovel-frames, a shovel-standard carried by the planter-frame in advance of said rolling hopper, and means for adjusting the planter-frame and its contained parts with relation to the arched axle, substantially as described.

2. In a combined cultivator and planter, the combination with an arched axle, a tongue, and the frames carrying the shovels, of a planter-frame having its side bars joined together by a cross-bar and pivoted at their front ends to said tongue, a rolling hopper mounted in the rear end of the planter-frame for adjustment therewith, a shovel-standard fixed to the cross-bar of said planter-frame and lying in advance of said hopper, a lever fulcrumed on the tongue and connected operatively with the planter-frame to suspend or lower the latter, and means for holding said lever in its adjusted position, substantially as described.

3. A planter attachment for cultivators consisting of the diverging frame-bars united firmly together by a cross-bar and having a pivotal attaching-bolt at their front ends, an axle supported by the frame-bars in rear of the cross-bar, a rolling hopper mounted loosely on said axle and provided with a drum which is perforated at intervals with seed-openings, a shovel-standard fixed to the cross-bar in advance of the rolling hopper, a regulator-bar fixed to the axle within the drum and arranged in the plane of the seed-openings thereof, and agitator-fingers secured to the heads of said drum and extending toward the regulator-bar, substantially as described.

In testimony that I claim the foregoing as my own I have hereto affixed my signature in the presence of two witnesses.

CHARLES W. McFARLAND.

Witnesses:
ALFRED H. BURRIS,
JAMES M. ALLENBERGH.